United States Patent
Hendry et al.

(10) Patent No.: US 10,313,696 B2
(45) Date of Patent: Jun. 4, 2019

(54) METHOD FOR STORING IMAGE INFORMATION, METHOD FOR PARSING IMAGE INFORMATION AND APPARATUS USING SAME

(71) Applicant: LG Electronics Inc., Seoul (KR)

(72) Inventors: Hendry Hendry, Seoul (KR); Kyungho Kim, Seoul (KR); Jinpil Kim, Seoul (KR); Byeongmoon Jeon, Seoul (KR); Jungsun Kim, Seoul (KR); Sangoh Jeong, Seoul (KR)

(73) Assignee: LG ELECTRONICS INC, Seoul (KR)

(*) Notice: Subject to any disclaimer, the term of this patent is extended or adjusted under 35 U.S.C. 154(b) by 500 days.

(21) Appl. No.: 14/385,694

(22) PCT Filed: Mar. 18, 2013

(86) PCT No.: PCT/KR2013/002190
§ 371 (c)(1),
(2) Date: Sep. 16, 2014

(87) PCT Pub. No.: WO2013/137697
PCT Pub. Date: Sep. 19, 2013

(65) Prior Publication Data
US 2015/0063467 A1    Mar. 5, 2015

Related U.S. Application Data

(60) Provisional application No. 61/611,594, filed on Mar. 16, 2012.

(51) Int. Cl.
*H04N 19/46* (2014.01)
*H04N 19/169* (2014.01)
*H04N 19/70* (2014.01)

(52) U.S. Cl.
CPC .......... *H04N 19/46* (2014.11); *H04N 19/188* (2014.11); *H04N 19/70* (2014.11)

(58) Field of Classification Search
None
See application file for complete search history.

(56) References Cited

U.S. PATENT DOCUMENTS 7,725,593 B2    5/2010    Visharam
2005/0175098 A1*    8/2005    Narasimhan ....... H04N 21/2368
375/240.12

(Continued)

FOREIGN PATENT DOCUMENTS

KR    1020070074503    7/2007
KR    1020110115087    10/2011

OTHER PUBLICATIONS

Rathgen, Thomas et al., "Coding of moving pictures and audio" In: international organisation for standardisation organisation internationale de normalisation iso/iec jtc1/sc29/wg11 Jul. 2005, pp. 2, 14-15, 20-21 and 26.

(Continued)

*Primary Examiner* — Frederick D Bailey
(74) *Attorney, Agent, or Firm* — Dentons US LLP (57) ABSTRACT

The present invention relates to a method for storing video information, to a method for parsing video information and to an apparatus using the same. The method for storing video information according to the present invention comprises: a step of encoding video information; and a step of storing a network abstraction layer (NAL) unit including the encoded video information in a decoder configuration record. The decoder configuration record may include information indicating the type of NAL unit.

14 Claims, 5 Drawing Sheets

(56) References Cited

U.S. PATENT DOCUMENTS

| | | | | |
|---|---|---|---|---|
| 2007/0177672 A1* | 8/2007 | Yang | .................... | H04N 19/597 |
| | | | | 375/240.25 |
| 2009/0123066 A1* | 5/2009 | Moriya | ................ | H04N 19/139 |
| | | | | 382/166 |
| 2010/0020884 A1* | 1/2010 | Pandit | .................. | H04N 19/597 |
| | | | | 375/240.25 |
| 2012/0269276 A1* | 10/2012 | Hong | .................... | H04N 19/70 |
| | | | | 375/240.25 |
| 2013/0195205 A1* | 8/2013 | Wang | .................... | H04N 19/70 |
| | | | | 375/240.26 |

OTHER PUBLICATIONS

Lee, Sun Hun et al., "Network-adaptive H.264 Video Streaming over IEEE 802.11e", Journal of broadcast engineering vol. 13 No. 1 2008, see p. 7, right column, lines 32-33, p. 8, left column, lines 3-5; p. 12, left column, lines 15-16, p. 12, right column, lines 2-4; figure 7.

\* cited by examiner

METHOD FOR STORING IMAGE INFORMATION, METHOD FOR PARSING IMAGE INFORMATION AND APPARATUS USING SAME

This application is a 35 USC § 371 National Stage entry of International Application No. PCT/KR2013/002190 filed on Mar. 18, 2013, and claims priority of U.S. Provisional Application No. 61/611,594 filed on Mar. 16, 2012, which are hereby incorporated by reference in its entirety.

TECHNICAL FIELD

The present invention relates to video compression technology, and more specifically, to the file format of compressed video information.

BACKGROUND ART

Recently, there is increasing demand for high-quality videos in various applications. Increased resolution and quality of videos causes an increase in the amount of information regarding the videos.

Accordingly, in case video information is transmitted by way of a medium such as the existing wired/wireless wideband circuit line or video information is stored using the existing storage media, the costs for transmitting and storing information increase.

High-efficiency video compression techniques may be put to use to effectively transmit, store, and replay high-quality video information.

For example, to raise efficiency of video compression, inter prediction and intra prediction may be used. In the inter prediction method, information of other pictures may be referenced to predict a pixel value of the current picture, and in the intra prediction method, a pixel value is predicted using the correlation between pixels in the same picture.

The encoding apparatus and decoding apparatus for compression-processing and reproducing video information compress and process a high volume of video information by a diversity of methods as described above.

However, even though video information is compressed and processed, as demand for high-quality videos increases as described above, the amount of video information processed is sharply increasing, and the amount of compressed video information is anticipated to be increased as compared with the conventional art.

Accordingly, it would be an issue how the format of video information files and files containing the information for processing the same is to be specified by media for effective process so as to treat a high volume of high-resolution video information.

SUMMARY OF INVENTION

Technical Problem

The present invention aims to provide a method and apparatus of encoding information on a high volume of high-quality video, storing information for reconstructing (decoding) the encoded video and transmitting the stored information efficiently.

The present invention aims to provide a method and apparatus of configuring an available file format which is supporting HEVC (High Efficiency Video Coding).

The present invention aims to provide a method and apparatus of effectively configuring a decoding configuration record in the file format.

Technical Solution

According to an embodiment of the present invention, a method of storing video information comprises encoding video information; and storing an NAL (Network Abstraction Layer) unit including the encoded video information in a decoder configuration record, wherein the decoder configuration record may include information indicating the type of the NAL unit.

According to another embodiment of the present invention, a method of parsing video information comprises parsing a decoder configuration record; and parsing an NAL unit based on the parsed decoder configuration record, wherein the decoder configuration record may include information indicating the type of the NAL unit.

According to still another embodiment of the present invention, an apparatus of storing video information using the video information storing method comprises an encoding unit encoding video information; and a storage unit storing an NAL (Network Abstraction Layer) unit including the encoded video information in a decoder configuration record, wherein the decoder configuration record may include information indicating the type of the NAL unit.

According to yet still another embodiment of the present invention, an apparatus of parsing video information using the video information parsing method comprises a parsing unit parsing a decoder configuration record; and a decoding unit parsing an NAL unit based on the parsed decoder configuration record, wherein the decoder configuration record may include information indicating the type of the NAL unit.

Advantageous Effects

According to the present invention, information for encoding and decoding a high volume of high-quality video information may be effective stored and transferred.

According to the present invention, an available file format may be configured by supporting HEVC (High Efficiency Video Coding).

According to the present invention, a decoding configuration record in the file format may be effectively configured so that the NAL unit information may be identified at a system level.

MODE FOR INVENTION

Various changes may be made to the present invention, and the present invention may have various embodiments.

Specific embodiments are described in detail with reference to the accompanying drawings. However, the present invention is not limited to the embodiments. The terms used herein are used for the illustrative purposes and are not intended to limit the present invention.

A singular term includes a plural term unless otherwise stated. As used herein, the terms "include" or "have" are used to indicate that there are features, numerals, steps, operations, components, parts or combinations thereof as described herein, but do not exclude the presence or possibility of addition of one or more features, numerals, steps, operations, components, parts or components thereof.

Meanwhile, the elements in the drawings are shown independently for ease of description on the different features from each other in the video encoding apparatus/decoding apparatus and should not be construed as meaning that the elements are implemented in separate pieces of hardware or software. For example, among the elements, two or more may be combined to configure a single element, and any one element may be divided into multiple elements. Embodiments where the elements are combined and/or each element is divided belong to the scope of the present invention without departing from the gist of the present invention.

Hereinafter, preferred embodiments of the present invention are described in detail with reference to the drawings. The same reference numerals refer to the same elements and the repetitive description on the same elements is omitted.

Recently, discussion about methods for processing high-resolution, high-volume video information is underway, and standardization to reflect the same is also discussion. In relation to this, it needs to be considered what format of files are to be put to used corresponding to the methods of processing high-volume, high-resolution videos.

Accordingly, the conventional file formats to process video information need to be modified or renewed to process high-volume/high-quality video information.

As described above, discussion on the video encoding/decoding methods for high-quality/high-volume video information and attempt to standardize the same are ongoing. During this course, besides the methods of increasing robustness and coding efficiency, various features to be used in the system are in discussion.

Regarding this, an issue is a format in which the video streams are stored to allow for effective support for the video encoding/decoding methods that are in discussion to raise video quality and compression efficiency.

Although the existing ISO-based media file format is available for high-quality/high-volume video content, it requires modification in view of the configuration of parameter sets.

Hereinafter, the decoder configuration record according to the present invention and the video information and file format based on the decoder configuration record are described below in detail.

As used herein, the high-volume, high-quality video coding method, for ease of description, is denoted HEVC (High Efficiency Video Coding), and the high-volume, high-quality content processed by adopting HEVC is denoted HEVC content.

For storage of the HEVC content, an extension of a file format considering the parameter set may be used, which is available for HEVC to the existing capacity of the media file format based on the ISO (International Organization for Standardization)—.

Figure 1:
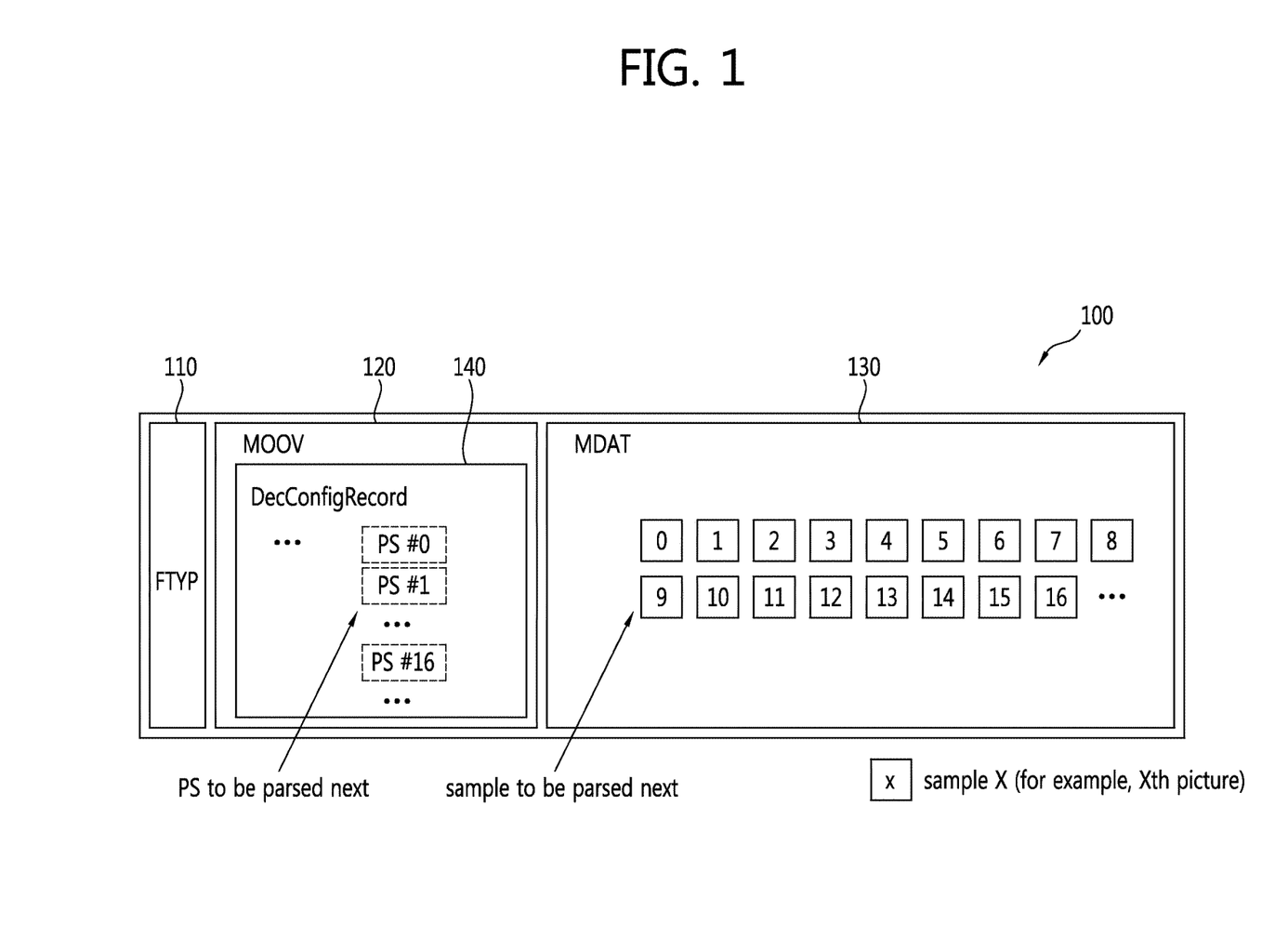
FIG. 1 illustrates an example media file format according to the present invention.

FIG. 1 illustrates an example media file format according to the present invention.

As described above, the media file format according to the present invention may be an extension to the ISO-based media file format.

The HEVC-supportive file 100 may include recursive boxes. For example, the file 100 has an object-oriented structure consisting of a series of objects called boxes. All the data is contained in the boxes, and each box may be defined as a unique identifier and a length.

Referring to FIG. 1, the file 100 may include an FTYP 110, an MOOV 120, and an MDAT 130. Further, although not shown, the file 100 may include tracks respectively corresponding to samples.

The FTYP 110 is a file type and contains information regarding a file type. The FTYP 110 is positioned at the beginning of the file 100.

The MOOV 120 is a box containing header information of the file 100. The MOOV 120 may include a decoder configuration record as decoder configuration information. For example, the HEVC visual sample entry contains the HEVC configuration box, and the HEVC configuration box may contain a HEVC decoder configuration record.

At this time, the MOOV 120 may include a HEVC visual sample entry or a HEVC configuration box. Further, the MOOV 120 may be a HEVC visual sample entry or a HEVC configuration box. Accordingly, in the example illustrated in FIG. 1, for ease of description, the MOOV 120 includes the HEVC decoder configuration record 140.

The MDAT 130 includes payload data. Accordingly, encoded data for a video file is delivered to this box. Referring to FIG. 1, the MDAT 130 includes samples.

The sample may mean an access unit. Sample X may be an Xth picture.

Meanwhile, the above-described decoder configuration record is a record regarding an initial configuration of the decoder, and the decoder parses information corresponding to the configuration.

In case the decoder configuration record is included in the sample entry, the decoder configuration record includes an NAL (Network Abstraction Layer) unit to which each sample belongs and a length field to indicate the length of a parameter set.

The NAL unit may be of a syntax structure including bytes containing data of an RSRP (Raw Byte Sequence Payload) type, which is, as necessary, deployed together with an indicator on the type of subsequent data and a byte to prevent competition.

The decoder configuration record may be externally framed. Accordingly, the file header and the file payload may be physically distinguished from each other.

Parameter sets to support HEVC include a video parameter set, a sequence parameter set, and a picture parameter set.

Transmitting of information which are not often varied are decoupled by using the video parameter set, the sequence parameter set, and the picture parameter set. For example, a slice including encoded block data may refer to the picture parameter set including the decoding parameters, and the picture parameter set may refer to the sequence parameter set to refer to the sequence level parameter. The sequence parameter set may likewise refer to the video parameter set to refer to the video level parameter.

A video stream may be represented by one video track in the file.

The elementary stream is an array or set of NAL units. The elementary stream may be defined a video elementary stream and a video and parameter set elementary stream.

The video elementary stream does not include a parameter set, and all of the parameter sets are included in the sample entry(ies). The video and parameter set elementary stream may include a parameter set and may include parameter sets included in the sample entry(ies).

The parameter set used in a picture is transmitted earlier than the sample including the picture or the sample for the picture. The sample entry when the video parameter set, the sequence parameter set, and the picture parameter set may be stored only in the sample entry for the video stream to which a particular sample entry applies, may be denoted hvc1, and the sample entry when the video parameter set, the sequence parameter set, and the picture parameter set may be stored in the sample entry and the samples is denoted hev1, and as necessary, two cases may be distinguished from each other.

As described above, the file format needs to be modified to support HEVC, and in particular, the decoder configuration record regarding the decoder initial configuration needs to be modified.

Table 1 shows an example decoder configuration record used to support video encoding/decoding according to the prior art. According to this disclosure, the conventional video encoding/decoding method is denoted AVC (Advanced Video Coding) to be distinguished from HEVC.

TABLE 1

```
aligned(8) class AVCDecoderConfigurationRecord {
    unsigned int(8) configurationVersion = 1;
    unsigned int(8) AVCProfileIndication;
    unsigned int(8) profile_compatibility;
    unsigned int(8) AVCLevelIndication;
    bit(6) reserved = '111111'b;
    unsigned int(2) lengthSizeMinusOne,
    bit(3) reserved = '111'b;
    unsigned int(5) numOfSequenceParameterSets;
    for (i=0; i< numOfSequenceParameterSets; i++) {
        unsigned int(16) sequenceParameterSetLength ;
        bit(8*sequenceParameterSetLength)
        sequenceParameterSetNALUnit;
    }
    unsigned int(8) numOfPictureParameterSets;
    for (i=0; i< numOfPictureParameterSets; i++) {
        unsigned int(16) pictureParameterSetLength;
        bit(8*pictureParameterSetLength) pictureParameterSetNALUnit;
    }
    if( profile_idc == 100 || profile_idc == 110 ||
        profile_idc == 122 || profile_idc == 144 )
    {
        bit(6) reserved = '111111'b;
        unsigned int(2) chroma_format;
        bit(5) reserved = '11111'b;
        unsigned int(3) bit_depth_luma_minus8;
        bit(5) reserved = '11111'b;
        unsigned int(3) bit_depth_chroma_minus8;
        unsigned int(8) numOfSequenceParameterSetExt;
        for (i=0; i< numOfSequenceParameterSetExt; i++) {
            unsigned int(16) sequenceParameterSetExtLength;
            bit(8*sequenceParameterSetExtLength)
sequenceParameterSetExtNALUnit;
        }
    }
}
```

The AVC-supportive decoder configuration record is referred to as AVCDecoderConfigurationRecord.

Referring to Table 1, AVCDecoderConfigurationRecord contains information (configurationVersion) to indicate the configuration version, information (AVCProfileIndication) to indicate the profile, information (profile compatibility) to indicate profile compatibility, and information (AVCLevelIndication) to indicate the level.

The profile refers to a sub group to which among encoding techniques a decoder configuration applies, and the level refers to a constraint according to the same.

In the decoder configuration record, the length (number of bits) assigned to each information is specified.

Table 2 shows an example decoder configuration record supportive of HEVC. For ease of description, the HEVC-supportive decoder configuration record is denoted HEVC-DecoderConfigurationRecord.

TABLE 2

```
aligned(8) class HEVCDecoderConfigurationRecord {
    unsigned int(8) configurationVersion = 1;
    unsigned int(8) ProfileIndication;
    unsigned int(8) profileCompatibility;
    unsigned int(8) LevelIndication;
    bit(6) reserved = '111111'b;
    unsigned int(2) chromaFormat;
    bit(5) reserved = '11111'b;
    unsigned int(3) bitDepthLumaMinus8;
    bit(5) reserved = '11111'b;
    unsigned int(3) bitDepthChromaMinus8;
    bit(16) avgFrameRate;
    bit(1) constantFrameRate;
    bit(3) numTemporalLayers;
    bit(2) reserved = '11'b;
    unsigned int(2) lengthSizeMinusOne;
    unsigned int(16) numInitializationNalus;
    for (i=0; i< numInitializationNalus; i++) {
        unsigned int(16) nalUnitLength;
        bit(8*nalUnitLength) nalUnit;
    }
}
```

Referring to Table 2, HEVCDecoderConfigurationRecord contains information (configurationVersion) to indicate the configuration version.

HEVCDecoderConfigurationRecord contains information regarding a sub group of techniques/tools applicable to HEVC and constraints that apply to the techniques/tools. Referring to Table 2, an example in which profileIndication, as information to indicate the profile, profileCompatibility, as information to indicate profile compatibility, and LevelIndication, as information to indicate the level, are described.

The profile indicates a tool or algorithm available in HEVC. The level indicates constraints as to particular parameters of a bit stream.

Although not shown in Table 2, HEVCDecoderConfigurationRecord may also contain information regarding a tier in addition to the profile and level, as constraint/restriction or configuration. The tier indicates information regarding the maximum bit rate and CPB (Coded Picture Buffer) capacities.

The bit stream does not have values different from the profile information and level information included in HEVCDecoderConfigurationRecord.

The information to indicate profile compatibility, profileCompatibility, indicates whether the encoded video sequence (CVS) complies with the profile.

HEVCDecoderConfigurationRecord includes information (chromaFormat) to indicate the format of the chroma component, information (bitDepthLumaMinus8) to indicate the bit depth of the luma component, and information (bitDepthChromaMinus8) to indicate the bit depth of the chroma component.

chromaFormat contains information indicating the chroma format for a stream to which a corresponding decoder configuration record applies. The chroma format for a video in a stream may be indicated by a chroma format indicator. For example, the value of the chroma format indicator being 0 may indicate monochrome, the value being 1 may indicate 4:2:0 sampling for the three components (Y, Cr, Cb) of color, and the value being 2 may indicate 4:2:2 sampling on the three components (Y, Cr, Cb) of color, and the value being 3 may indicate 4:4:4 sampling on the three components (Y, Cr, Cb) of color.

bitDepthLumaMinus8 contains information to specify the bit depth of a luma sample array for a stream to which a corresponding decoder configuration record applies. At this time, the bit depth of the luma quantization parameter range offset may also be specified by the information to specify the bit depth of the luma sample array.

bitDepthChromaMinus8 contains information to specify the bit depth of a chroma sample array for a stream to which a corresponding decoder configuration record applies. At this time, the bit depth of the chroma sample quantization parameter range offset may also be specified based on the information to specify the bit depth of the chroma sample array.

HEVCDecoderConfigurationRecord includes information regarding a frame rate. For example, HEVCDecoderConfigurationRecord may include information (avgFrameRate) to indicate an average frame rate value, constant frame rate information (constantFrameRate) to configure a frame rate value to constantly replay an video, and information (numTemporalLayers) to indicate the number of temporal layers.

avgFrameRate indicates an average frame rate for a stream to which a corresponding decoder configuration record applies. avgFrameRate being 0 indicates an unspecified average frame rate.

constantFrameRate indicates whether a frame rate is constant for a stream to which a corresponding decoder configuration record applies. For example, constantFrameRate being 0 indicates that the stream may or may not have a constant frame rate. constantFrameRate being 1 indicates that the stream has a constant frame rate. constantFrameRate being 2 indicates that the representation of each temporal layer in the stream has a constant frame rate.

numTemporalLayers includes information to specify a temporal layer coefficient of a stream to which a corresponding decoder configuration record applies. For example, numTemporalLayers being 0 indicates whether the stream is temporally scalable, and numTemporalLayers being 1 indicates that the stream is not temporally scalable. numTemporalLayers being larger than 1 may indicate that the stream is temporally scalable and that the same number of temporal layers as numTemporalLayers are included.

HEVCDecoderConfigurationRecord may include information, lengthSizeMinusOne, regarding the NAL unit length of the HEVC video sample in a stream to which a corresponding decoder configuration record applies. For example, lengthSizeMinusOne may represent the length of the NAL unit length (NALUnitLength) field of the HEVC video sample in the stream in bytes. For example, a one-bit size may be indicated as lengthSizeMinusOne being 0.

HEVCDecoderConfigurationRecord may contain information on the number of NAL units. In the example shown in Table 2, the number of NAL units of the stream to which a corresponding decoder configuration record applies may be specified through numInitializationNalus.

In HEVCDecoderConfigurationRecord, each NAL unit and the length of the NAL unit are specified by nalUnit and nalUnitLength, respectively. At this time, the length of NAL unit may be specified in bytes.

Meanwhile, there are some differences between the decoder configuration record for AVC illustrated in Table 1 and the decoder configuration record for HEVC illustrated in Table 2.

In AVCDecoderConfigurationRecord, among the syntax elements, the information regarding the chroma format (chroma_format), the information regarding the bit depth of the luma sample (bit_depth_luma_minus8), and the information on the bit depth of the chroma sample (bit_depth_chroma_minus8) are conditionally transmitted as per profile information.

In contrast, in HEVCDecoderConfigurationRecord, the syntax elements chroma_format, bit_depth_luma_minus8, and bit_depth_chroma minus8 are always unconditionally signaled.

Further, HEVCDecoderConfigurationRecord, unlike AVCDecoderConfigurationRecord, does not support SPS extension (Sequence Parameter Set extension: SequenceParameterSetExt).

The non-VCL (Non-Video Coding Layer) NAL unit, together with the VCL NAL unit, may be stored in the payload, and may be stored in the decoder configuration record. In case the non-VCL NAL unit is stored in the decoder configuration record, SPS (Sequence Parameter Set) and PPS (Picture Parameter Set) are separately signaled in different arrays in AVCDecoderConfigurationRecord. At this time, an SEI (Supplemental Enhancement Information) message may be signaled in the SPS and PPS.

In HEVCDecoderConfigurationRecord, contrarily, all the non-VCL NAL units (for example, SPS, PPS, APS (Adaptation Parameter Set), SEI, etc.) are mixed in one array or in one initialization NAL unit.

As such, HEVCDecoderConfigurationRecord has different features from AVCDecoderConfigurationRecord.

However, the decoder configuration record for HEVC, HEVCDecoderConfigurationRecord, has also something that needs to be enhanced for effective video coding (encoding/decoding).

Hereinafter, HEVCDecoderConfigurationRecord and its effects according to the present invention are described below in connection with specific embodiments of the present invention.

1. Method of Signaling Elements in HEVC Decoder Configuration Record (HEVCDecoderConfigurationRecord)

In HEVCDecoderConfigurationRecord of Table 2, syntax elements are being signaled as shown in Table 3 below.

Table 3 shows signaling only constantFrameRate, numTemporalLayers, and lengthSizeMinusOne among the syntax elements shown in Table 2.

TABLE 3 bit(1) constantFrameRate;
bit(3) numTemporalLayers;
bit(2) reserved = '11' b;
unsigned int(2) lengthSizeMinusOne Referring to Table 3, constantFrameRate is assigned with 1 bit, numTemporalLayers is assigned with 3 bits, and lengthSizeMinusOne is assigned with 2 bits, with 2 bits assigned as reserved bits.

Accordingly, assuming that an eight-bit parser is used to read streams every eight bits, in the case shown in Table 3, eight-bit string data is rendered to include three or more syntax elements.

Thus, it is difficult to smoothly perform parsing and to maintain simplicity of per-eight bits parsing.

To address such issues, one of the following two embodiments may be put to use.

(Embodiment 1-1) Method of Applying eight-bit Aligned Signaling to all Syntax Elements.

In embodiment 1-1, all the syntax elements signaled in HEVCDecoderConfigurationRecord are aligned in units of eight bits. At this time, padding bits may be used for the syntax elements that do not have the size of eight-bit unit.

For example, syntax elements whose size is insufficient to be eight bits or multiples thereof may add a padding bit before or behind the syntax elements. The reserved bits may be used as the padding bits.

Table 4 shows an example of HEVCDecoderConfigurationRecord according to embodiment 1-1.

TABLE 4

```
aligned(8) class HEVCDecoderConfigurationRecord {
    unsigned int(8) configurationVersion = 1;
    unsigned int(8) ProfileIndication;
    unsigned int(8) profileCompatibility;
    unsigned int(8) LevelIndication;
    bit(6) reserved = '111111'b;
    unsigned int(2) chromaFormat;
    bit(5) reserved = '11111'b;
    unsigned int(3) bitDepthLumaMinus8;
    bit(5) reserved = '11111'b;
    unsigned int(3) bitDepthChromaMinus8;
    bit(16) avgFrameRate;
    bit(6) reserved = '111111'b;
    bit(2) constantFrameRate;
    bit(5) reserved = '11111'b;
    bit(3) numTemporalLayers;
    bit(6) reserved = '111111'b;
    unsigned int(2) lengthSizeMinusOne;
    unsigned int(16) numInitializationNalus;
    for (i=0; i< numInitializationNalus; i++) {
        unsigned int(16) nalUnitLength;
        bit(8*nalUnitLength) nalUnit;
    }
}
```

In Table 3, reserved bits are added before the syntax elements that do not have a size of eight-bit unit so that transmission for the syntax elements is performed in units of eight bits and so that the parsing of the syntax elements is performed in units of eight bits.

In other words, in embodiment 1-1, the reserved bit is added before the syntax element so that parsing/transmission may be carried out per syntax element in units of eight bits.

For example, in the example shown in Table 3, 6 reserved bits are added to allow transmission/parsing for constantFrameRate to be performed in units of eight bits. In the case of numTemporalLayers, five reserved bits are added to allow transmission/parsing to be performed in units of eight bits. Further, 6 reserved bits are added so that transmission/parsing for lengthSizeMinusOne is performed in units of eight bits.

As described above in connection with Table 2, constantFrameRate being 0 indicates that the stream may or may not have a constant frame rate. constantFrameRate being 1 indicates that the stream has a constant frame rate. constantFrameRate being 2 indicates that the representation of each temporal layer of the stream has a constant frame rate.

Accordingly, not one bit but two bits are assigned to constantFrameRate.

According to embodiment 1-1, parsing may be simply performed. Since syntax elements may be simply parsed in units of eight bits, a parser may be simply implemented.

Further, one pass/one cycle parsing is made possible with an eight-bit parser. For example, if the eight-bit parser parses syntax elements in the conventional HEVCDecoderConfigurationRecord, an additional process is required to extract the syntax elements, constantFrameRate, numTemporalLayers, and lengthSizeMinusOne. However, application of embodiment 1-1 eliminates the need for an additional process.

Although in Table 4 the reserved bit is added before the syntax element so that transmission/parsing is performed in units of eight bits, the present invention is not limited thereto. The reserved bit may be added behind the syntax element so that transmission/parsing for the syntax element is performed in units of eight bits.

Further, although in Table 4, parsing is performed in units of eight bits, for example, the present invention is not limited thereto. For example, in case a parser that performs parsing not in units of eight bits but in units of X bits is put to use, the syntax element may be adapted to be transmitted/parsed in units of X bits. At this time, a reserved bit may be added before or behind the syntax element so that transmission/parsing is performed in units of eight bits per syntax element.

(Embodiment 1-2) Minimize Use of Reserved Bits in Signaling Syntax Elements

In HEVCDecoderConfigurationRecord according to embodiment 1-2, a syntax element is signaled in a compact form, and use of reserved bits is minimized. The reserved bits may be used as the last means to allow the entire HEVCDecoderConfigurationRecord length to be byte-aligned.

Table 5 shows an example of HEVCDecoderConfigurationRecord according to embodiment 1-2.

TABLE 5

```
aligned(8) class HEVCDecoderConfigurationRecord {
    unsigned int(8) configurationVersion = 1;
    unsigned int(8) ProfileIndication;
    unsigned int(8) profileCompatibility;
    unsigned int(8) LevelIndication;
    unsigned int(2) chromaFormat;
    unsigned int(3) bitDepthLumaMinus8;
    unsigned int(3) bitDepthChromaMinus8;
    bit(16) avgFrameRate;
    bit(1) reserved = '1' b;
    bit(2) constantFrameRate;
    bit(3) numTemporalLayers;
    unsigned int(2) lengthSizeMinusOne;
    unsigned int(16) numInitializationNalus;
    for (i=0; i< numInitializationNalus; i++) {
        unsigned int(16) nalUnitLength;
        bit(8*nalUnitLength) nalUnit;
    }
}
```

In the example shown in Table 5, only one reserved bit is used to byte-aligned the entire HEVCDecoderConfigurationRecord.

The reserved bit is minimally used as necessary so that single syntax elements may be transmitted/parsed in units of eight bits. For example, the reserved bit may be added to an syntax element(s) that has(have) bits fewer than eight bits so that the syntax elements may be transmitted/parsed in units of eight bits.

Use of HEVCDecoderConfigurationRecord according to embodiment 1-2 enables compact signaling with a smaller number of bits as compared with using the conventional HEVCDecoderConfigurationRecord.

2. Method of Signaling NAL Unit in HEVC Decoder Configuration Record (HEVCDecoderConfigurationRecord)

A method of signaling an initialization NAL unit in HEVCDecoderConfigurationRecord matters alongside or separately from adjustment of syntax elements as per the above-described unit of parsing/transmission.

In AVCDecoderConfigurationRecord of Table 1, SPS, PPS, APS, and SEI messages are being signaled in individual arrays, and in HEVCDecoderConfigurationRecord of Table 2, NAL units of VPS (Video Parameter Set), SPS (Sequence Parameter Set), and PPS (Picture Parameter Set) are mixed and signaled.

At this time, an APS (Adaptation Parameter Set) adaptively available may be transmitted in HEVCDecoderConfigurationRecord as necessary.

Since HEVCDecoderConfigurationRecord is information to specify an initial configuration of a decoder, the NAL unit transmitted in HEVCDecoderConfigurationRecord is referred to as initialization NAL unit in this disclosure for ease of description.

Like in HEVCDecoderConfigurationRecord of Table 2, in case initialization NAL units are mixed, the parser of HEVCDecoderConfigurationRecord should refer to the NAL unit header to be aware of the type of the initialization NAL unit parsed.

In this case, the parser's operation and the entire structure of HEVCD file format are complicated, and more burden may be put on the parser.

Accordingly, there is a need for the HEVC file format not to be involved in the details of HEVC encoding/decoding, i.e., to reduce the burden on the parser and to enable simplified process of information required at the file format level processed in the system.

According to the present invention, HEVCDecoderConfigurationRecord is configured to enable the information required to treat HEVC files to be available at the file format level. Specifically, in HEVCDecoderConfigurationRecord according to the present invention, the parser does not refer to the NAL unit header information or lower-level information and may recognize the type of NAL unit using only the information on HEVCDecoderConfigurationRecord.

To the end, either or both of the following embodiments may be used.

Embodiment (2-1) add type Information for Distinguish Initialization NAL Units from Each Other Although it is possible to identify the type of additional NAL unit of the type information to distinguish initialization NAL units by parsing the first byte of the header information in the initialization NAL unit, information necessary to treat the HEVC file cannot be used at the system level (e.g., file format level) but is instead obtained by referring to the low-level information as described above.

In embodiment 2-1, the type of initialization NAL unit is signaled in HEVCDecoderConfigurationRecord. Specifically, in HEVCDecoderConfigurationRecord, information regarding the type and length of the initialization NAL unit per initialization NAL unit are transmitted in HEVCDecoderConfigurationRecord, and the corresponding initialization NAL unit is subsequently transmitted.

Table 6 shows an example of HEVCDecoderConfigurationRecord according to embodiment 2-1.

TABLE 6

```
aligned(8) class HEVCDecoderConfigurationRecord {
    unsigned int(8) configurationVersion = 1;
    unsigned int(8) ProfileIndication;
    unsigned int(8) profileCompatibility;
    unsigned int(8) LevelIndication;
    bit(6) reserved = '111111' b;
    unsigned int(2) chromaFormat;
    bit(5) reserved = '11111' b;
    unsigned int(3) bitDepthLumaMinus8;
    bit(5) reserved = '11111' b;
    unsigned int(3) bitDepthChromaMinus8;
    bit(16) avgFrameRate;
    bit(2) constantFrameRate;
    bit(3) numTemporalLayers;
    bit(1) reserved = '1' b;
    unsigned int(2) lengthSizeMinusOne;
    unsigned int(16) numInitializationNalus;
    for (i=0; i< numInitializationNalus; i++) {
        bit(2) initializationNalUnitType;
        unsigned int(14) nalUnitLength;
        bit(8*nalUnitLength) nalUnit;
    }
}
```

In Table 6, the initialization NAL unit type indicator, initializationNalUnitType, specifies the type of an associated initialization NAL unit.

For example, in case the type of initialization NAL unit transmitted in HEVCDecoderConfigurationRecord is SPS, PPS, APS, or SEI, initializationNalUnitType may indicate which one of the types each NAL unit per initialization NAL unit.

Table 7 shows an example table used to make the initializationNalUnitType value correspond to the initialization NAL unit type in case the type of initialization NAL unit transmitted in HEVCDecoderConfigurationRecord is SPS, PPS, APS, or SEI, according to the present invention.

TABLE 7

| Initialization NalUnitType | Type of initialization Nal Unit |
| --- | --- |
| 0 | SPS (Sequence parameter set) |
| 1 | PPS (Picture parameter set) |
| 2 | APS (Adaptation parameter set) |
| 3 | SEI(Supplemental Enhancement Information) |

Although in Table 7 the type of initialization NAL unit transmitted in HEVCDecoderConfigurationRecord is SPS, PPS, APS, or SEI, for example, the present invention is not limited thereto. For example, the adaptively used parameter set, APS, is not used, and transmission of VPS may be needed instead.

Table 8 shows an example table used to make the initializationNalUnitType value correspond to the initialization NAL unit type in case the type of initialization NAL unit transmitted in HEVCDecoderConfigurationRecord is SPS, PPS, VPS, or SEI, according to the present invention.

TABLE 8

| Initialization NalUnitType | Type of initialization Nal Unit |
| --- | --- |
| 0 | VPS (Video Parameter Set) |
| 1 | SPS (Sequence Parameter Set) |
| 2 | PPS (Picture Parameter Set) |
| 3 | SEI(Supplemental Enhancement Information) |

Further, the type of initialization NAL unit transmitted in HEVCDecoderConfigurationRecord may be one of VPS, SPS, PPS, APS, and SEI.

Table 9 shows an example table used to make the initializationNalUnitType value correspond to the initialization NAL unit type in case the type of initialization NAL unit transmitted in HEVCDecoderConfigurationRecord is VPS, SPS, PPS, APS, or SEI, according to the present invention.

TABLE 9

| Initialization NalUnitType | Type of initialization Nal Unit |
|---|---|
| 0 | VPS (Video Parameter Set) |
| 1 | SPS (Sequence Parameter Set) |
| 2 | PPS (Picture Parameter Set) |
| 3 | APS (Adaptation parameter set) |
| 4 | SEI(Supplemental Enhancement Information) |

In Tables 7 to 9, the PPS (Picture Parameter Set) is a syntax structure including a syntax element indicating parameter information applied to 0 or more pictures. The syntax element included in the PPS may be referenced as required by the syntax element of the slice segment header.

The SPS (Sequence Parameter Set) is a syntax structure including a syntax element indicating parameter information applied to 0 or more coded video sequences. The syntax element included in the SPS may be referenced as required by the syntax element in the PPS.

The VPS (Video Parameter Set) is a syntax structure including a syntax element indicating parameter information applied to 0 or more coded video sequences. The syntax element included in the VPS may be referenced as required by the syntax element in the SPS.

The SEI (Supplemental Enhancement Information) message is information added to the bit stream to effectively use videos to fit for various purposes.

HEVCDecoderConfigurationRecord may indicate at the system level the type of each NAL unit transmitted in HEVCDecoderConfigurationRecord using any one of Tables 7 to 9.

For example, the terminal at the receiving side (system at the decoder side) may parse initializationNalUnitType in HEVCDecoderConfigurationRecord to grasp the type of a corresponding NAL unit according to the initializationNalUnitType value.

In Table 6, nalUnitLength indicates the length of initialization NAL unit indicated by initializationNalUnitType.

In Table 6, nalUnit is an initialization NAL unit indicated by initializationNalUnitType. In case Table 7 is used, nalUnit may be one of SPS, PPS, APS, and SEI. In case Table 8 is used, nalUnit may be any one of VPS, SPS, PPS, and SEI. Further, in case Table 9 is used, nalUnit may be one of VPS, SPS, PPS, APS, and SEI.

Referring to Table 6, if the number of initialization NAL units included in HEVCDecoderConfigurationRecord is specified by numInitializationNalus, the type and length of the initialization NAL units are sequentially indicated as many as the number of initialization NAL units, and the corresponding initialization NAL units are transmitted.

Although in Table 6 initializationNalUnit and nalUnit are mixed, this is for the purpose of indicating that the NAL unit transmitted in HEVCDecoderConfigurationRecord is the initialization NAL unit while simply describing HEVCDecoderConfigurationRecord. The related expressions may be interchangeably used or one of them alone may be used for consistency.

Table 10 shows an example of HEVCDecoderConfigurationRecord according to embodiment 2-1, in case information regarding the initialization NAL unit transmitted in HEVCDecoderConfigurationRecord is simply represented using 'nalUnit' instead of 'initializationNalUnit.'

TABLE 10

```
aligned(8) class HEVCDecoderConfigurationRecord {
    unsigned int(8) configurationVersion = 1;
    unsigned int(8) ProfileIndication;
    unsigned int(8) profileCompatibility;
    unsigned int(8) LevelIndication;
    bit(6) reserved = '111111' b;
    unsigned int(2) chromaFormat;
    bit(5) reserved = '11111' b;
    unsigned int(3) bitDepthLumaMinus8;
    bit(5) reserved = '11111' b;
    unsigned int(3) bitDepthChromaMinus8;
    bit(16) avgFrameRate;
    bit(2) constantFrameRate;
    bit(3) numTemporalLayers;
    bit(1) reserved = '1' b;
    unsigned int(2) lengthSizeMinusOne;
    unsigned int(16) numNalus;
    for (i=0; i< numNalus; i++) {
        bit(2) nalUnitType;
        unsigned int(14) nalUnitLength;
        bit(8*nalUnitLength) nalUnit;
    }
}
```

Although in Table 10 'nalUnit,' instead of 'initializationNalUnit,' is used to express the information regarding the NAL unit, the details are the same as those described above in connection with Table 6.

Although in Tables 6 and 10, in HEVCDecoderConfigurationRecord, the NAL unit type is indicated per initialization NAL unit, the present invention is not limited thereto. For example, in HEVCDecoderConfigurationRecord, the length of each initialization NAL unit may be indicated per NAL unit type, and the initialization NAL unit may be transmitted.

Table 11 shows another example of HEVCDecoderConfigurationRecord according to embodiment 2-1.

TABLE 11

```
aligned(8) class HEVCDecoderConfigurationRecord {
    unsigned int(8) configurationVersion = 1;
    unsigned int(2) profile_space;
    unsigned int(1) tier_flag;
    unsigned int(5) profile_idc;
    unsigned int(32) profile_compatibility_indications;
    unsigned int(16) constraint_indicator_flags;
    unsigned int(8) level_idc;
    unsigned int(8) min_spatial_segmentation_idc;
    bit(6) reserved = '111111' b;
    unsigned int(2) chromaFormat;
    bit(5) reserved = '11111' b;
    unsigned int(3) bitDepthLumaMinus8;
    bit(5) reserved = '11111' b;
    unsigned int(3) bitDepthChromaMinus8;
    bit(16) avgFrameRate;
    bit(2) constantFrameRate;
    bit(3) numTemporalLayers;
    bit(1) temporalIdNested;
    unsigned int(2) lengthSizeMinusOne;
    unsigned int(8) numOfNalUnitType;
    for (j=0; j< numOfNalUnitType; j++) {
        unsigned int(8) numOfNalUnitType
        unsigned int(6) NAL_unit_type;
        unsigned int(16) numNalus;
        for (i=0; i< numNalus; i++) {
            unsigned int(16) nalUnitLength;
            bit(8*nalUnitLength) nalUnit;
        }
    }
}
```

In Table 11, numOfNalUnitType indicates the number of NAL unit types indicated in HEVCDecoderConfigurationRecord, and NAL_unit_type specifies an NAL unit type.

numNalus indicates the number of initialization NAL units corresponding to the NAL unit type specified by NAL_unit_type.

Referring to Table 11, the length of each initialization NAL unit belonging to the NAL unit type is sequentially indicated as many as the number of the initialization NAL units corresponding to the NAL unit type specified by NAL_unit_type, and the initialization NAL unit is transmitted.

Although in Tables 6, 10 and 11, the initialization NAL unit(s) corresponding to the NAL unit type(s) in HEVCDecoderConfigurationRecord is(are) included in one NAL unit array, the present invention is not limited thereto. For example, the present invention also applies to the case where the initialization NAL units corresponding to the NAL unit type(s) are included in one or more NAL unit arrays.

Table 12 shows still another example of HEVCDecoderConfigurationRecord according to embodiment 2-1.

TABLE 12

```
aligned(8) class HEVCDecoderConfigurationRecord {
    unsigned int(8) configurationVersion = 1;
    unsigned int(2) profile_space;
    unsigned int(1) tier_flag;
    unsigned int(5) profile_idc;
    unsigned int(32) profile_compatibility_indications;
    unsigned int(16) constraint_indicator_flags;
    unsigned int(8) level_idc;
    unsigned int(8) min_spatial_segmentation_idc;
    bit(6) reserved = '111111' b;
    unsigned int(2) chromaFormat;
    bit(5) reserved = '11111' b;
    unsigned int(3) bitDepthLumaMinus8;
    bit(5) reserved = '11111' b;
    unsigned int(3) bitDepthChromaMinus8;
    bit(16) avgFrameRate;
    bit(2) constantFrameRate;
    bit(3) numTemporalLayers;
    bit(1) temporalIdNested;
    unsigned int(2) lengthSizeMinusOne;
    unsigned int(8) numOfArrays;
    for (j=0; j < numOfArrays; j++) {
        bit(1) array_completeness;
        unsigned int(1) reserved = 0;
        unsigned int(6) NAL_unit_type;
        unsigned int(16) numNalus;
        for (i=0; i< numNalus; i++) {
            unsigned int(16) nalUnitLength;
            bit(8*nalUnitLength) nalUnit;
        }
    }
}
```

Referring to Table 12, numArrays indicates the number of the arrays of the initialization NAL units of the type(s) indicated in HEVCDecoderConfigurationRecord.

array_completeness indicates whether the initialization NAL unit(s) corresponding to the initialization NAL unit type in HEVCDecoderConfigurationRecord is(are) included in one array (of NAL units). For example, array_completeness being 1 indicates that all the NAL units of a given type are included in a following array, and array_completeness being 0 indicates that among the initialization NAL units of a given type, the initialization NAL units that are not in the following array are present in the stream.

numNalus indicates the number of initialization NAL units of the NAL unit type in HEVCDecoderConfigurationRecord for the stream to which HEVCDecoderConfigurationRecord applies.

Referring to Table 12, the NAL unit type and the number of initialization NAL units corresponding to the NAL unit type are indicated per initialization NAL unit array. At this time, as many as the number of initialization NAL units corresponding to the NAL unit type, the length of each initialization NAL unit is sequentially indicated, and the initialization NAL unit is transmitted.

Embodiment (2-2) Transmit different types of Initialization NAL Units in Different Arrays In embodiment 2-2, initialization NAL units are transmitted per NAL unit type in HEVCDecoderConfigurationRecord. Specifically, the initialization NAL units of different NAL unit types in HEVCDecoderConfigurationRecord may be transmitted in different arrays per NAL unit type.

For example, if the type of NAL unit transmitted in HEVCDecoderConfigurationRecord is some or all of VPS, SPS, PPS, SEI, and APS, for the NAL unit corresponding to each parameter set/message, the initialization NAL units are transmitted in different arrays per parameter set/message. Accordingly, the NAL units corresponding to the VPS are collectively transmitted, and the initialization NAL units corresponding to the SPS are transmitted in other array(s), and the initialization NAL units corresponding to the PPS may be transmitted in still other array(s).

At this time, the order of arrays in DecoderConfigurationRecord may be determined based on the predicted number of initial units per NAL unit type.

For example, the array(s) for signaling the initialization NAL units (SPS NAL units) whose NAL unit type is the SPS may appear earlier than the array(s) for signaling the initialization NAL units of other types. Subsequently, the array(s) for signaling the initialization NAL units (PPS NAL units) whose NAL unit type is the PPS may be positioned.

The array(s) for signaling the initialization NAL units (SEI NAL units) whose NAL unit type is the SEI message may be then positioned.

If the APS is used, the array(s) for signaling the initialization NAL units (APS NAL units) whose NAL unit type is the APS may come last.

Further, if the VPS is used, the array(s) for signaling the initialization NAL units (VPS NAL units) whose NAL unit type is the VPS may come first.

Table 13 shows an example of DecoderConfigurationRecord according to embodiment 2-2.

TABLE 13

```
aligned(8) class HEVCDecoderConfigurationRecord {
    unsigned int(8) configurationVersion = 1;
    unsigned int(8) ProfileIndication;
    unsigned int(8) profileCompatibility;
    unsigned int(8) LevelIndication;
    bit(6) reserved = '111111' b;
    unsigned int(2) chromaFormat;
    bit(5) reserved = '11111' b;
    unsigned int(3) bitDepthLumaMinus8;
    bit(5) reserved = '11111' b;
    unsigned int(3) bitDepthChromaMinus8;
    bit(16) avgFrameRate;
    bit(2) constantFrameRate;
    bit(3) numTemporalLayers;
    bit(1) reserved = '1' b;
    unsigned int(2) lengthsizeMinusOne;
    unsigned int(8) numOfSequenceParameterSets;
    for (i=0; i< numOfSequenceParameterSets; i++) {
        unsigned int(16) sequenceParameterSetLength;
        bit(8* sequenceParameterSetLength)
        sequenceParameterSetNALUnit;
    }
    unsigned int(8) numOfPictureParameterSets;
    for (i=0; i< numOfPictureParameterSets; i++) {
```

TABLE 13-continued

```
        unsigned int(16) pictureParameterSetLength;
        bit(8* pictureParameterSetLength)
        pictureParameterSetNALUnit;
    }
    unsigned int(8) numOfDeclarativeSEIs;
    for (i=0; i< numOfDeclarativeSEIs; i++) {
        unsigned int(16) declarativeSetLength;
        bit(8* declarativeSeiLength) declarativeSeiNALUnit;
    }
    unsigned int(16) numOfAdaptationParameterSets;
    for (i=0; i< numOfAdaptationParameterSets; i++) {
        unsigned int(16) adaptationParameterSetLength;
        bit(8* adaptationParameterSetLength)
        adaptationParameterSetNALUnit;
    }
}
```

In Table 13, numOfSequenceParameterSets indicates the number of SPSs used for decoding a stream to which a decoder configuration record applies. numOfSequenceParameterSets being 0 indicates that there is no SPS in the samples of the stream, and numOfSequenceParameterSets being larger than 0 indicates that at least one SPS (for example, as many SPSs as the corresponding value) is included in the samples of the stream.

sequenceParameterSetLength indicates the length of SPS NAL units in bytes.

numOfPictureParameterSets indicates the number of PPSs used for decoding the stream to which a decoder configuration record applies. numOfPictureParameterSets being 0 indicates that there is no PPS in the samples of the stream, and numOfPictureParameterSets being larger than 0 indicates that at least one PPS (for example, as many PPSs as the corresponding value) is included in the samples of the stream.

pictureParameterSetLength indicates the length of PPS NAL units in bytes.

numOfDeclarativeSEIs indicates the number of declarative SEIs used for decoding the stream to which a corresponding applies. numOfDeclarativeSEIs being 0 indicates that there is no declarative SEI in the samples of the stream, and numOfDeclarativeSEIs being larger than 0 indicates that at least one declarative SEI (for example, as many declarative SEIs as the corresponding value) is included in the samples of the stream.

declartiveSeiLength indicates the length of SEI units in bytes.

numOfAdaptationParameterSets indicates the number of APSs used for decoding the stream to which a decoder configuration record applies. numOfAdaptationParameterSets being 0 indicates that there is no APS in the samples of the stream, and numOfAdaptationParameterSets being larger than 0 indicates that at least one APS is included in the samples of the stream.

adaptationParameterSetLength indicates the length of APS NAL units in bytes.

Although the NAL unit is included in DecoderConfigurationRecord and is transmitted according to this disclosure, for ease of description, the present invention is not limited thereto.

As described above, the NAL unit may be stored in DecoderConfigurationRecord and may be transmitted over a network. Further, the NAL unit may be stored in DecoderConfigurationRecord, and DecoderConfigurationRecord may be stored in a storage medium and transferred. Further, although DecoderConfigurationRecord or a stream including DecoderConfigurationRecord being received is set forth in this disclosure, this is merely for convenience of description, and the present invention is not limited thereto. As used herein, DecoderConfigurationRecord or a stream including DecoderConfigurationRecord being received may mean that DecoderConfigurationRecord or the stream including DecoderConfigurationRecord is received over a network or that DecoderConfigurationRecord or the stream including DecoderConfigurationRecord is obtained from a storage medium.

Figure 2:
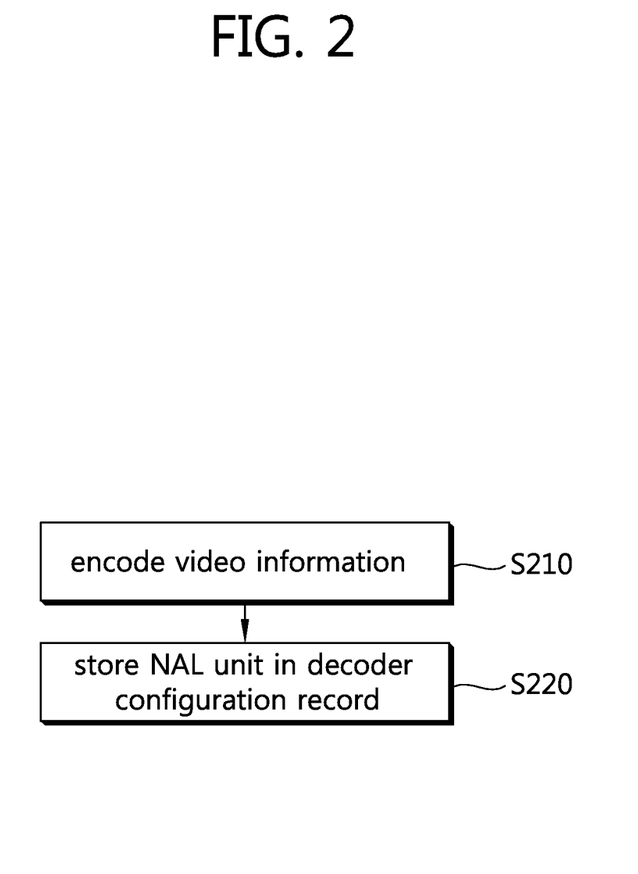
FIG. 2 is a flowchart schematically illustrating a method of storing video information according to the present invention.

FIG. 2 is a flowchart schematically illustrating a method of storing video information according to the present invention. In FIG. 2, the video information may be information corresponding to some or all of the media file formats described above in connection with FIG. 1 and include decoder configuration information (DecoderConfigurationRecord).

Here, for ease of description, the video information storage apparatus is described to perform each step shown in FIG. 2.

Referring to FIG. 2, the video information storage apparatus may encode video information (S210). For example, the video information storage apparatus may encode video content based on HEVC. The video information storage apparatus may generate a NAL unit including information necessary for decoding and encoded video content.

The video information storage apparatus may store the NAL unit in the decoder configuration record (S220). The decoder configuration record may include information to indicate the type of NAL unit stored. At this time, the type of NAL unit may be VPS, SPS, PPS, or SEI.

The details of the decoder configuration record have been described above in connection with FIG. 1 and the tables. For example, since the decoder configuration record may be parsed in units of predetermined bits, unless the syntax elements are in units of eight bits, the video information storage apparatus may be configured to add a reserved bit so that the bits assigned to the syntax element and the reserved bit are eight bits or multiples of eight bits.

Further, the decoder configuration record may include information indicating the type of NAL unit and information indicating the length of the NAL unit, together with the NAL unit.

Further, one or plurality arrays of NAL units may be included in the decoder configuration record. In case there are a plurality of NAL unit arrays, the decoder configuration record may include information indicating the type of NAL unit per array.

The decoder configuration record, if the storage for one array is complete, may store the NAL unit and corresponding information for the next array.

Also in this case, the decoder configuration record may include the NAL units belonging to the NAL unit type together with the information indicating the length of NAL unit. At this time, the decoder configuration record may also store information on the NAL units belonging to the NAL unit type and NAU unit together with the information indicating the NAL unit type. After information corresponding to all the NAL units belonging to one NAL unit type are arranged (stored) in one array, information corresponding to the NAL unit belonging to the next NAL unit type may be stored.

Although the video information storage apparatus performs the operations (S210 and S220) and configuration of a decoder configuration record, for ease of description, each step may also be performed in individual units in the video information storage apparatus.

Figure 3:
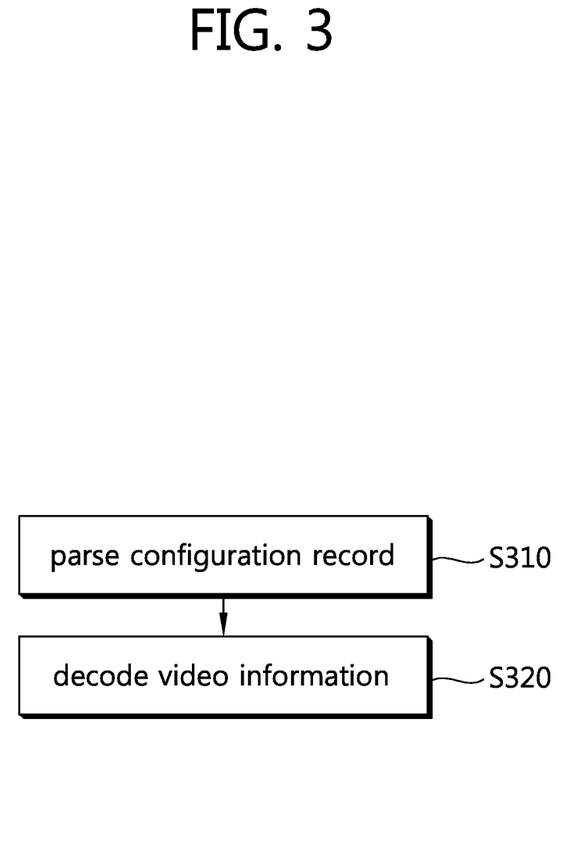
FIG. 3 is a flowchart schematically illustrating a method of parsing video information according to the present invention.

FIG. 3 is a flowchart schematically illustrating a method of parsing video information according to the present invention. The video information shown in FIG. 3 may be information corresponding to some or all of the media file formats described above in connection with FIG. 1 and includes decoder configuration information (DecoderConfigurationRecord).

Here, for ease of description, a video information parsing apparatus performs each step shown in FIG. 3.

Referring to FIG. 3, the video information parsing apparatus may parse a decoder configuration record (S310). The decoder configuration record is information belonging to the file format, and parsing may be performed at the system level. By parsing the decoder configuration record, the video information parsing apparatus may obtain information regarding the profile, level, format, or bit depth of the corresponding video information. The video information parsing apparatus may obtain information regarding the type and length of NAL unit included in the decoder configuration record.

Further, the decoder configuration record according to the present invention includes information indicating the type of NAL unit, and thus, the video information parsing apparatus may parse the decoder configuration record to obtain the information indicating the type of NAL unit. Accordingly, the video information parsing apparatus may determine the type of NAL unit included in the decoder configuration record at the system level and may perform parsing accordingly.

Parsing may mean obtaining a specific value of a syntax element and/or data (information). Parsing on the decoder configuration record may be performed in units of predetermined bits. For example, the parser performing parsing in the video information parsing apparatus is an eight-bit parser, and parsing may be performed in units of eight bits.

Meanwhile, the decoder configuration record is the same as those described earlier in connection with FIG. 1 and the tables. For example, the decoder configuration record may include, together the information indicating the NAL unit type, the information indicating the length of the NAL unit alongside the NAL unit.

Further, one or plurality NAL unit arrays may be included in the decoder configuration record. In case there are a plurality of NAL unit arrays, the decoder configuration record may include information indicating the type of NAL unit per array.

In case there are a plurality of NAL unit arrays, the decoder configuration record may store information on one array, and the following may store the NAL unit for the next array and corresponding information.

Also in this case, the decoder configuration record may include the NAL units belonging to the NAL unit type, together with information on the length of the NAL unit. At this time, the decoder configuration record may store the information on the NAL units belonging to the NAL unit type and NAL unit alongside the information indicating the type of NAL unit. One array stores information corresponding to all the NAL units belonging to one NAL unit type, and the following may store information corresponding to the NAL unit belonging to the next NAL unit type.

The information stored in the decoder configuration record may be sequentially parsed based on the stored order.

The video information parsing apparatus may decode video information based on the parsed decoder configuration record (S320). The video information parsing apparatus may process information corresponding to the decoder configuration record based on the parsed decoder configuration record and might not process or recognize the information that does not match the decoder configuration record.

Hereinafter, for ease of description, decoding includes parsing and restoring video information. Further, the restoration of video information may be conducted in the video information parsing apparatus, or may be performed by a separate decoder based on a result of the parsing performed by the video information parsing apparatus.

The video information parsing apparatus may parse the NAL units per NAL unit type based on the parsed decoder configuration record. In case the decoder configuration record includes a plurality of NAL unit arrays, the NAL units may be parsed per array according to the type of NAL units.

Although the NAL units have been described in connection with FIGS. 2 and 3 for ease of description, the NAL units included in the decoder configuration record may be the initialization NAL units as described earlier.

Figure 4:
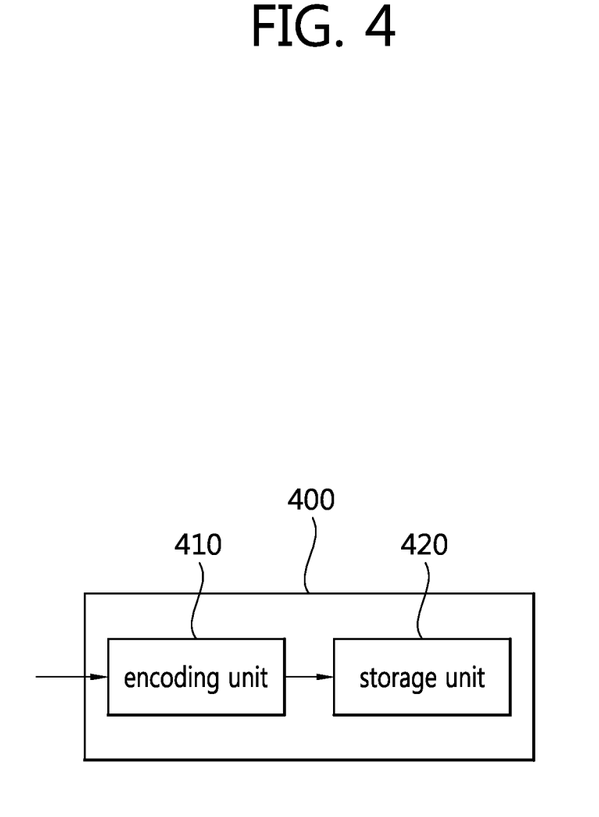
FIG. 4 is a block diagram schematically illustrating a configuration of an video information storage apparatus according to the present invention.

FIG. 4 is a block diagram schematically illustrating a configuration of an video information storage apparatus according to the present invention. In FIG. 4, the video information may be information corresponding to some or all of the media file formats described above in connection with FIG. 1, and includes decoder configuration information (DecoderConfigurationRecord).

Referring to FIG. 4, the video information storage apparatus 400 includes an encoding unit 410 and a storage unit 420.

The encoding unit 410 may encode input video information. For example, the encoding unit 410 may encode video information using an HEVC-supportive method. The encoding unit 410 may generate an NAL unit including information necessary for decoding and encoded video content.

The storage unit 420 may store the generated NAL unit in the decoder configuration record. The decoder configuration record may include information indicating the type of NAL unit. At this time, the type of NAL unit may be VPS, SPS, PPS, or SEI. The details of the decoder configuration record have been described earlier.

Figure 5:
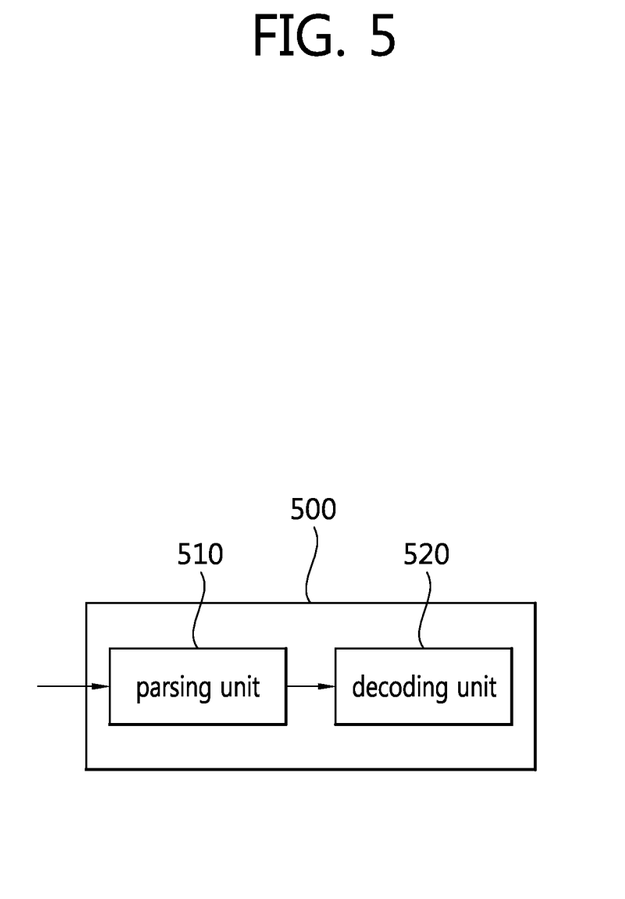
FIG. 5 is a block diagram schematically illustrating a configuration of an video information parsing apparatus according to the present invention.

FIG. 5 is a block diagram schematically illustrating a configuration of an video information parsing apparatus according to the present invention. In FIG. 5, the video information may be information corresponding to some or all of the media file formats described above in connection with FIG. 1 and includes decoder configuration information (DecoderConfigurationRecord).

Referring to FIG. 5, the video information parsing apparatus 500 includes a parsing unit 510 and a decoding unit 520.

The parsing unit 510 may parse the decoder configuration record in the file format. The parsing unit 510 may parse the decoder configuration record at the system level. The decoder configuration record includes the NAL unit and information indicating the type of the NAL unit.

The parsing unit 510 may parse the decoder configuration record to obtain information regarding the profile, level, format, and bit depth of the video information. Further, the parsing unit 510 may obtain the information regarding the length and type of the NAL unit included in the decoder configuration record.

The decoder configuration record has been described above.

The decoding unit 520 may decode the video information based on the decoder configuration record. The decoding unit 520 may process information corresponding to the decoder configuration record based on the parsed decoder configuration record and might not process or recognize the information that does not match the decoder configuration record.

For ease of description, an example in which decoding includes parsing and restoring video information has been described in connection with FIG. 5. Further, the restoration of video information may be performed by the decoding unit 520 of the video information parsing apparatus 500 or by a separate decoder from the video information parsing apparatus 500 based on a result of the parsing performed by the video information parsing apparatus 500.

In the above-described example system, the methods are described based on the flowcharts with a series of steps or blocks, but the present invention is not limited to the order of the steps, and rather, some steps may be performed simultaneously or in different order with other steps. Further, the above-described embodiments include various aspects of examples. Accordingly, the present invention includes all other changes, modifications, and variations belonging to the following claims.

What is claimed is:

1. A method of storing video information, the method comprising:
    obtaining, by a video information storage apparatus, encoded video information;
    deriving, by the video information storage apparatus, network abstraction layer (NAL) units including the encoded video information; and
    generating, by the video information storage apparatus, a media file including the NAL units,
    wherein the NAL units are included in a decoder configuration record of the media file,
    wherein the decoder configuration record explicitly includes a NAL unit type syntax element, wherein the NAL unit type syntax element variably indicates a NAL unit type among NAL unit types of a NAL unit type group including a sequence parameter set (SPS) NAL unit type, a picture parameter set (PPS) NAL unit type and a supplemental enhancement information (SEI) NAL unit type,
    wherein in the decoder configuration record, at least one NAL unit is stored according to the NAL unit type specified by the NAL unit type syntax element of the decoder configuration record,
    wherein the at least one NAL unit is stored in the decoder configured record after the NAL unit type syntax element, and
    wherein the decoder configuration record includes a constant frame rate syntax element configured by 2 bits,
    wherein the decoder configuration record includes a NAL unit length syntax element indicating a length of an associated NAL unit corresponding to the NAL unit type, and
    wherein, in the decoder configuration record, the NAL unit type syntax element is configured by 2 bits and the NAL unit length syntax element is configured by 14 bits.

2. The method of claim 1, wherein when syntax elements included in the decoder configuration record are not in units of eight bits, one or more reserved bits are added so that bits assigned to the syntax elements and the reserved bits are adjusted to be eight bits or a multiple of eight bits.

3. The method of claim 2, wherein the reserved bits are added before the syntax elements.

4. The method of claim 1, wherein when the decoder configuration record includes a plurality of NAL unit arrays, the decoder configuration record includes the NAL unit type syntax element per array.

5. The method of claim 1, wherein the media file comprises a FTYP box indicating a type of the media file, a MOOV box including header information of the media file, and a MDAT box including payload data of the media file, and
    wherein the decoder configuration record is included in the MOOV box.

6. The method of claim 1, wherein value 0 of the constant frame rate syntax element indicates that a stream to which the decoder configuration record applies is not restricted to be of constant frame rate, value 1 of the constant frame rate syntax element indicates that the stream is of constant frame rate, value 2 of the constant frame rate syntax element indicates that each temporal layer representation in the stream is of constant frame rate.

7. A method of parsing video information, the method comprising:
    obtaining, by a video information parsing apparatus, a decoder configuration record from a received media file;
    parsing, by the video information parsing apparatus, a NAL unit type syntax element explicitly included in the decoder configuration record, wherein the NAL unit type syntax element variably indicates a NAL unit type among NAL unit types of a NAL unit type group including a sequence parameter set (SPS) NAL unit type, a picture parameter set (PPS) NAL unit type and a supplemental enhancement information (SEI) NAL unit type; and
    parsing, by the video information parsing apparatus, at least one NAL unit, included in the decoder configuration record, based on the NAL unit type syntax element,
    wherein a NAL unit is parsed according to a NAL unit type specified by the NAL unit type syntax element of the decoder configuration record,
    wherein the at least one NAL unit is stored in the decoder configured record after the NAL unit type syntax element, and
    wherein the decoder configuration record includes a constant frame rate syntax element configured by 2 bits,
    wherein the decoder configuration record includes a NAL unit length syntax element indicating a length of an associated NAL unit corresponding to the NAL unit type, and
    wherein, in the decoder configuration record, the NAL unit type syntax element is configured by 2 bits and the NAL unit length syntax element is configured by 14 bits.

8. The method of claim 7, wherein in parsing syntax elements in the decoder configuration record, the syntax elements in the decoder configuration record is parsed in units of eight bits, and wherein among syntax elements included in the decoder configuration record, syntax elements that are not in units of eight bits are parsed together with one or more reserved bits.

9. The method of claim 7, wherein when the decoder configuration record includes a plurality of NAL unit arrays, the decoder configuration record includes the NAL unit type syntax element per array.

10. The method of claim 7, wherein the media file comprises a FTYP box indicating a type of the media file, a MOOV box including header information of the media file, and a MDAT box including payload data of the media file, and wherein the decoder configuration record is included in the MOOV box.

11. The method of claim 7, wherein value 0 of the constant frame rate syntax element indicates that a stream to which the decoder configuration record applies is not restricted to be of constant frame rate, value 1 of the constant frame rate syntax element indicates that the stream is of constant frame rate, value 2 of the constant frame rate syntax element indicates that each temporal layer representation in the stream is of constant frame rate.

12. An apparatus of storing video information, comprising:

an encoding unit for encoding video information; and a storage unit for obtaining the encoded video information, for deriving network abstraction layer (NAL) units from the encoded video information, and for generating a media file including the NAL units, wherein the storage unit configures a decoder configuration record of the media file, wherein the NAL units are included in the decoder configuration record of the media file, wherein the decoder configuration record explicitly includes a NAL unit type syntax element, wherein the NAL unit type syntax element variably indicates a NAL unit type among NAL unit types of a NAL unit type group including a sequence parameter set (SPS) NAL unit type, a picture parameter set (PPS) NAL unit type and a supplemental enhancement information (SEI) NAL unit type, wherein in the decoder configuration record, a NAL unit is stored according to a NAL unit type specified by the NAL unit type syntax element of the decoder configuration record, wherein the at least one NAL unit is stored in the decoder configured record after the NAL unit type syntax element, and wherein the decoder configuration record includes a constant frame rate syntax element configured by 2 bits, wherein the decoder configuration record includes a NAL unit length syntax element indicating a length of an associated NAL unit corresponding to the NAL unit type, and wherein, in the decoder configuration record, the NAL unit type syntax element is configured by 2 bits and the NAL unit length syntax element is configured by 14 bits.

13. An apparatus of parsing video information, comprising:

a parsing unit obtaining a decoder configuration record from a received media file, parsing a NAL unit type syntax element explicitly included in the decoder configuration record, wherein the NAL unit type syntax element variably indicates a NAL unit type among NAL unit types of a NAL unit type group including a sequence parameter set (SPS) NAL unit type, a picture parameter set (PPS) NAL unit type and a supplemental enhancement information (SEI) NAL unit type, and parsing NAL units, included in the decoder configuration record, based on the NAL unit type syntax element of the decoder configuration record; and a decoding unit decoding video information based on the NAL units including the video information, wherein a NAL unit is parsed according to a NAL unit type specified by the NAL unit type syntax element, wherein the at least one NAL unit is stored in the decoder configured record after the NAL unit type syntax element, and wherein the decoder configuration record includes a constant frame rate syntax element configured by 2 bits, wherein the decoder configuration record includes a NAL unit length syntax element indicating a length of an associated NAL unit corresponding to the NAL unit type, and wherein, in the decoder configuration record, the NAL unit type syntax element is configured by 2 bits and the NAL unit length syntax element is configured by 14 bits.

14. The apparatus of claim 13, wherein when the decoder configuration record includes a plurality of NAL unit arrays, the decoder configuration record includes the NAL unit type syntax element per array.

* * * * *